United States Patent
Zhang

(10) Patent No.: US 10,997,722 B2
(45) Date of Patent: May 4, 2021

(54) SYSTEMS AND METHODS FOR IDENTIFYING A BODY MOTION

(71) Applicant: BEIJING DIDI INFINITY TECHNOLOGY AND DEVELOPMENT CO., LTD., Beijing (CN)

(72) Inventor: Xiubao Zhang, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/945,978

(22) Filed: Aug. 3, 2020

(65) Prior Publication Data

US 2020/0364861 A1  Nov. 19, 2020

Related U.S. Application Data

(63) Continuation of application No. PCT/CN2018/084418, filed on Apr. 25, 2018.

(51) Int. Cl.
*G06T 7/68* (2017.01)
*G06T 7/00* (2017.01)
(Continued)

(52) U.S. Cl.
CPC .......... *G06T 7/0012* (2013.01); *G06T 7/248* (2017.01); *G06T 7/68* (2017.01); *G06T 7/73* (2017.01);
(Continued)

(58) Field of Classification Search
CPC .......... G06K 9/00221; G06K 9/00228; G06K 9/00248; G06K 9/00261; G06K 9/00268;
(Continued)

(56) References Cited

U.S. PATENT DOCUMENTS

| 7,091,976 B1 | 8/2006 | Ostermann et al. .......... 345/473 |
| 7,650,017 B2 | 1/2010 | Yamada ........................ 382/107 |

(Continued)

FOREIGN PATENT DOCUMENTS

| CN | 101561710 A | 10/2009 | ............... G06F 3/01 |
| CN | 101739712 A | 6/2010 | ............. G06T 15/70 |

(Continued)

OTHER PUBLICATIONS

International Search Report in PCT/CN2018/084418 dated Jan. 16, 2019, 4 pages.
(Continued)

*Primary Examiner* — Andrew W Johns
(74) *Attorney, Agent, or Firm* — Metis IP LLC

(57) ABSTRACT

A method for identifying a body motion includes receiving a series of images including a visual presentation of a human face from the image capture device. The series of images may form an image sequence. Each of the series of images may have a previous image or a next image in the image sequence. The method also includes, for each of the series of images, determining a plurality of characteristic points on the human face, determining positions of the plurality of characteristic points on the human face, and determining an asymmetry value based on the positions of the plurality of characteristic points. The method further includes identifying a head-shaking movement of the human face based on the asymmetry values of the series of images.

15 Claims, 16 Drawing Sheets

(51) Int. Cl.
*G06T 7/73* (2017.01)
*G06T 7/246* (2017.01)

(52) U.S. Cl.
CPC ............... *G06T 2207/10016* (2013.01); *G06T 2207/30201* (2013.01)

(58) Field of Classification Search
CPC ........... G06K 9/00281; G06K 9/00315; G06K 9/00335; G06T 7/246; G06T 7/68; G06T 7/73; G06T 2207/30201
See application file for complete search history.

(56) References Cited

U.S. PATENT DOCUMENTS

| | | | | |
|---|---|---|---|---|
| 8,798,336 | B2 | 8/2014 | Nechyba et al. | 382/118 |
| 9,665,784 | B2 | 5/2017 | Derakhshani et al. | G06K 9/00906 |
| 2005/0271252 | A1 | 12/2005 | Yamada | 382/103 |
| 2007/0183633 | A1* | 8/2007 | Hoffmann | G06K 9/00221 382/116 |
| 2012/0183238 | A1* | 7/2012 | Savvides et al. | G06K 9/00281 382/285 |
| 2013/0163825 | A1 | 6/2013 | Shimura | G06K 9/00335 |
| 2013/0235033 | A1 | 9/2013 | Kim et al. | G06T 17/00 |
| 2017/0124383 | A1 | 5/2017 | Ohbitsu | G06K 9/00268 |
| 2017/0169304 | A1 | 6/2017 | Jia et al. | G06K 9/00906 |
| 2018/0032828 | A1 | 2/2018 | Wang et al. | G06K 9/00906 |
| 2018/0225842 | A1 | 8/2018 | Wang | G06T 7/73 |
| 2018/0232561 | A1 | 8/2018 | Zheng et al. | G06K 9/00281 |

FOREIGN PATENT DOCUMENTS

| | | | |
|---|---|---|---|
| CN | 101763636 A | 6/2010 | G06T 7/00 |
| CN | 102375970 B | 3/2016 | G06K 9/00 |
| CN | 106295549 A | 1/2017 | G06K 9/00 |
| CN | 107066983 A | 8/2017 | G06K 9/00 |
| CN | 110263691 A | 9/2019 | G06K 9/00 |
| WO | 2017124929 A1 | 7/2017 | G06K 9/00 |

OTHER PUBLICATIONS

Written Opinion in PCT/CN2018/084418 dated Jan. 16, 2019, 5 pages
First Office Action in Chinese Application No. 201880044545.9 dated Jun. 19, 2020, 13 pages.

* cited by examiner

800

```
┌─────────────────────────────────────────────────────┐
│ For each of the series of images, obtain positions  │
│ of the first point, the second point, the third     │──810
│ point, the fourth point, and the fifth point        │
└─────────────────────────────────────────────────────┘
                          │
                          ▼
         ┌──────────────────────────┐
   No   ╱   The third point located   ╲ ──820
◄───────   within the quadrangle?      
         ╲                            ╱
          └──────────────────────────┘
                          │ Yes
                          ▼
┌─────────────────────────────────────────────────────┐
│ Determine a first angle based on the first point,    │──830
│ the third point, and the fourth point                │
└─────────────────────────────────────────────────────┘
                          │
                          ▼
┌─────────────────────────────────────────────────────┐
│ Determine a second angle based on the second point, │──840
│ the third point, and the fifth point                │
└─────────────────────────────────────────────────────┘
                          │
                          ▼
┌─────────────────────────────────────────────────────┐
│ Determine the asymmetry value based on the first    │──850
│ angle and the second angle                          │
└─────────────────────────────────────────────────────┘

┌─────────────────────────────────────────────────────┐
│ Determine the asymmetry value according to an       │
│ asymmetry value of a previous image of the each of  │──860
│ the series of images                                │
└─────────────────────────────────────────────────────┘
```

Determine a first image of the series of images in the image sequence that has an asymmetry value less than a first threshold asymmetry value — 1510

Determine a second image of the series of images in the image sequence that has an asymmetry value less than the first threshold asymmetry value — 1520

Obtain asymmetry values of a group of images including the first image, the second image, and one or more images between the first image and second image in the image sequence — 1530

Identify a head shaking movement based on the asymmetry values of the group of images and a number count of the group of images — 1540

FIG. 15

SYSTEMS AND METHODS FOR IDENTIFYING A BODY MOTION

CROSS-REFERENCE TO RELATED APPLICATIONS

This application is a Continuation Application of International Application No. PCT/CN2018/084418 filed on Apr. 25, 2018, the entire contents of which are hereby incorporated by reference.

TECHNICAL FIELD

The present disclosure relates to an image processing technology, and more particularly to, systems and methods for identifying a body motion.

BACKGROUND

In recent years, face authentication, for example, by a camera, is widely used in multiple fields (e.g., system login, security, finance) for preventing fraud. Examples of face authentication including identifying movement of a human body part, such as eye blinking and nodding, may require a user to be very close to the camera. If the user stays relatively far away from the camera, the accuracy of identifying such motion may deteriorate sharply. Accordingly, it may be desirable to provide systems and methods for improving the accuracy of identifying a body motion of a user when he or she stays a certain distance away from the camera.

SUMMARY

According to an aspect of the present disclosure, a system may include an image capture device, a storage device including a set of instructions, and at least one processor in communication with the storage device. When executing the set of instructions, the at least one processor may be directed to cause the system to: receive a series of images including a visual presentation of a human face from the image capture device. The series of images may form an image sequence. Each of the series of images may have a previous image or a next image in the image sequence. For each of the series of images, the at least one processor may be further directed to cause the system to: determine a plurality of characteristic points on the human face; determine positions of the plurality of characteristic points on the human face; and determine an asymmetry value based on the positions of the plurality of characteristic points. The at least one processor may be further directed to cause the system to identify a head-shaking movement of the human face based on the asymmetry values of the series of images.

In some embodiments, the plurality of characteristic points may include a first point, a second point, a third point, a fourth point, and a fifth point. In a front view of the human face: the first point and the second point may be symmetrical with respect to a symmetrical line through the third point; the fourth point and the fifth point may be symmetrical with respect to the symmetrical line through the third point; and the third point may be located within a quadrangle determined based on the first point, the second point, the fourth point, and the fifth point.

In some embodiments, the first point may be in a central region of a left-eye on the human face. The second point may be in a central region of a right-eye on the human face. The third point may be in a tip region of the nose on the human face. The fourth point may be in a left end region of a lip on the human face. The fifth point may be in a right end region of the lip of the human face.

In some embodiments, to determine the asymmetry value based on the positions of the plurality of characteristic points for each of the series of images, the processor may be further directed to cause the system to: determine whether the third point in the each of the series of images is not located within the quadrangle determined based on the first point, the second point, the fourth point, and the fifth point in the each of the series of images; and determine, based on a result of the determination that the third point in the each of the series of images is not located within the quadrangle determined based on the first point, the second point, the fourth point, and the fifth point in the each of the series of images, the asymmetry value according to an asymmetry value of a previous image of the each of the series of images.

In some embodiments, to determine the asymmetry value based on the positions of the plurality of characteristic points for each of the series of images, the processor may be further directed to cause the system to: based on a result of the determination that the third point in the each of the series of images is located within the quadrangle determined based on the first point, the second point, the fourth point, and the fifth point in the each of the series of images: determine a first angle based on the first point, the third point, and the fourth point; determine a second angle based on the second point, the third point, and the fifth point; and determine the asymmetry value based on the first angle and the second angle.

In some embodiments, the first angle may be an angle between a line segment connecting the first point and the third point, and a line segment connecting the fourth point and the third point. The second angle may be an angle between a line segment connecting the second point and the third point, and a line segment connecting the fifth point and the third point.

In some embodiments, the first angle may be an angle between a line segment connecting the first point and the fourth point, and a line segment connecting the fourth point and the third point. The second angle may be an angle between a line segment connecting the second point and the fifth point, and a line segment connecting the fifth point and the third point.

In some embodiments, the first angle may be an angle between a line segment connecting the first point and the fourth point, and a line segment connecting the first point and the third point. The second angle may be an angle between a line segment connecting the second point and the fifth point, and a line segment connecting the second point and the third point.

In some embodiments, to identify a head-shaking movement of the human face based on the asymmetry values of the series of images, the processor may be further directed to cause the system to: determine a first image of the series of images in the image sequence that has an asymmetry value less than a first asymmetry value threshold; determine a second image of the series of images in the image sequence that has an asymmetry value less than the first asymmetry value threshold, the second image being a subsequent image of the first image in the image sequence; obtain asymmetry values of a group of images including the first image, the second image, and one or more images between the first image and second image in the image sequence; and identify a head-shaking movement of the human face based on the asymmetry values of the group of images and a number count of images in the group of images.

In some embodiments, to identify a head-shaking movement of the human face based on the asymmetry values of the group of images and the number count of the images in the group of images, the processor may be further directed to cause the system to: identify a maximum asymmetry value among the asymmetry values of the group of images; determine whether the maximum asymmetry value is greater than a second asymmetry value threshold; determine whether the number count of images in the group of images is greater than a threshold number count; and identify a head-shaking movement of the human face from the group of images based on a result of the determination that the maximum asymmetry value is greater than the second asymmetry value threshold and a result of the determination that the number count of images in the group of images is greater than the threshold number count.

According to another aspect of the present disclosure, a method may include receiving a series of images including a visual presentation of a human face from an image capture device. The series of images may form an image sequence. Each of the series of images may have a previous image or a next image in the image sequence. The method may further include determining a plurality of characteristic points on the human face; determining positions of the plurality of characteristic points on the human face; and determining an asymmetry value based on the positions of the plurality of characteristic points. The method may further include identifying a head-shaking movement of the human face based on the asymmetry values of the series of images.

According to still another aspect of the present disclosure, a non-transitory computer-readable medium may include at least one set of instructions. When executed by at least one processor of a computer device, the at least one set of instructions may direct the at least one processor to: receive a series of images including a visual presentation of a human face from the image capture device. The series of images may form an image sequence. Each of the series of images may have a previous image or a next image in the image sequence. For each of the series of images, the at least one processor may be further directed to: determine a plurality of characteristic points on the human face; determine positions of the plurality of characteristic points on the human face; and determine an asymmetry value based on the positions of the plurality of characteristic points. The at least one processor may be further directed to identify a head-shaking movement of the human face based on the asymmetry values of the series of images.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 8 is a flowchart illustrating an exemplary process for determining an asymmetry value based on the positions of the plurality of characteristic points according to some embodiments of the present disclosure;

FIG. 15 is a flowchart illustrating an exemplary process for identifying a head-shaking movement according to some embodiments of the present disclosure;

DETAILED DESCRIPTION

Figure 1:
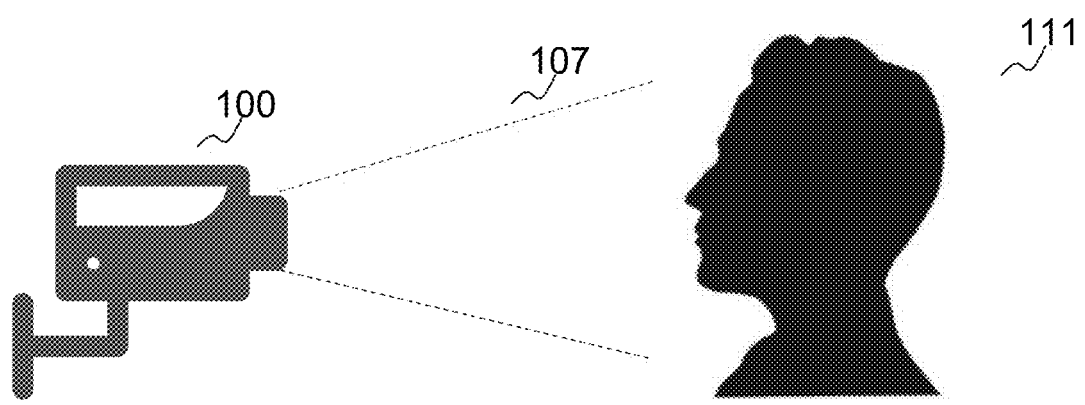
FIG. 1 is a schematic diagram illustrating an operation state of an exemplary system for identifying a head-shaking movement according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purposes of describing particular exemplary embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include,"

"includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purposes of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding online service for face authentication, it should also be understood that this is only one exemplary embodiment. The systems or methods of the present disclosure may be applied to any kind of online service or off-line service. For example, the systems or methods of the present disclosure may be applied to security systems for user login (e.g., user login for on-demand systems), check-in (e.g., check-in systems at hotel or airport), user verification (e.g., for user account verification at an automated teller machine (ATM)), or the like, or any combination thereof. The on-demand systems may include, for example, transportation/take-out/express services. The application of the systems or methods of the present disclosure may include a webpage, a plug-in of an Internet browser, a client terminal, a custom system, an internal analysis system, an artificial intelligence robot, or the like, or any combination thereof.

The present disclosure provides systems and methods for identifying a head-shaking movement. The systems may capture a plurality of images of a human face by an image capture device (e.g., a camera). The systems may process the plurality of images of the human face and identify characteristic points of the human face in the plurality of images. The systems may also determine asymmetry values of the human face in the images based on the identified characteristic points. The systems may further determine whether there is a head-shaking movement based on the asymmetry values.

FIG. 1 is a schematic diagram illustrating a using state of an exemplary system for identifying a head-shaking movement according to some embodiments of the present disclosure. The system 100 may include at least one image capture device that can capture images in a field of view 107 of the image capture device. As shown in FIG. 1, the field of view 107 may include a human face 111. The system 100 may capture a plurality of images including the human face 111. The system 100 may then determine whether there is a head-shaking movement based on the plurality of images. Details about the system 100 may be found elsewhere in the present disclosure (e.g., FIG. 2 and the descriptions thereof).

Figure 2:
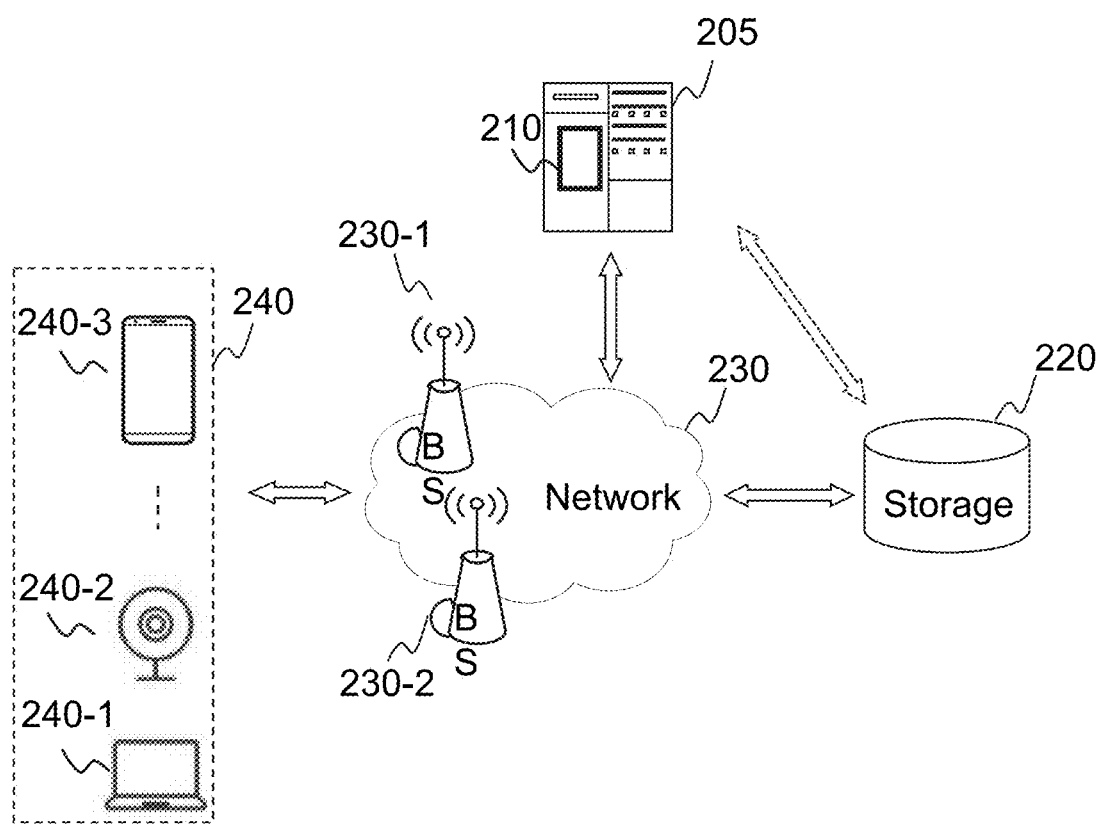
FIG. 2 is a schematic diagram illustrating an exemplary system for identifying a head-shaking movement according to some embodiments of the present disclosure.

FIG. 2 is a schematic diagram illustrating an exemplary system for identifying a head-shaking movement according to some embodiments of the present disclosure. The system 200 may include a server 205, a storage 220, a network 230, and an image capture device 240. The system 200 may be an example of the system 100.

In some embodiments, the server 205 may be a single server or a server group. The server group may be centralized, or distributed (e.g., server 205 may be a distributed system). In some embodiments, the server 205 may be local or remote. For example, the server 205 may access information and/or data stored in the image capture device 240, and/or the storage 220 via the network 230. As another example, the server 205 may be directly connected to the storage 220 to access stored information and/or data. In some embodiments, the server 205 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 205 may be implemented on a computing device 300 having one or more components illustrated in FIG. 3.

In some embodiments, the server 205 may include a processing engine 210. The processing engine 210 may process information and/or data relating to identifying a head-shaking movement to perform one or more functions described in the present disclosure. For example, the processing engine 210 may determine one or more characteristic points on the human face for each of the plurality of images corresponding to the human face and determine an asymmetry value for each of the plurality of images based on the characteristic points to identify the head-shaking movement. In some embodiments, the processing engine 210 may include one or more processing engines (e.g., single-core processing engine(s) or multi-core processor(s)). The processing engine 210 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The storage 220 may store data and/or instructions relating to identifying a head-shaking movement. In some embodiments, the storage 220 may store data obtained from the image capture device 240. In some embodiments, the storage 220 may store data and/or instructions that the server 205 may execute or use to perform exemplary methods described in the present disclosure. In some embodiments, the storage 220 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 220 may be connected to the network 230 to communicate with one or more components of the system 200 (e.g., the server 205, the image capture device 240). One or more components of the system 200 may access the data and/or instructions stored in the storage 220 via the network 230. In some embodiments, the storage 220 may be directly connected to or communicate with one or more components of the system 200 (e.g., the server 205, the image capture device 240). In some embodiments, the storage 220 may be part of the server 205.

In some embodiments, one or more components of the system 200 (e.g., the server 205, the image capture device 240) may have permissions to access the storage 220. In some embodiments, one or more components of the system 200 may read and/or modify information relating to the human face and/or the public when one or more conditions are met. For example, the server 205 may read and/or modify one or more of the plurality of images corresponding to the human face after the identification is completed.

The network 230 may facilitate exchange of information and/or data. In some embodiments, one or more components of the system 200 (e.g., the server 205, the image capture device 240, or the storage 220) may transmit information and/or data to another component (s) of the system 200 via the network 230. For example, the server 205 may obtain a plurality of images corresponding to the human face from the image capture device 240 via the network 230. In some embodiments, the network 230 may be any type of wired or wireless network, or any combination thereof. Merely by way of example, the network 230 may include a cable network, a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 230 may include one or more network access points. For example, the network 230 may include wired or wireless network access points such as base stations and/or internet exchange points 230-1, 230-2, . . . , through which one or more components of the system 200 may be connected to the network 230 to exchange data and/or information.

In some embodiments, the image capture device 240 may include a laptop computer 240-1 with a camera, a camera 240-2, a smartphone 240-3 with a camera, a smartwatch with a camera, an onboard computer with a camera, an onboard television with a camera, a wearable device with a camera, or the like, or any combination thereof. In some embodiments, the image capture device 240 may capture a plurality of images including a human face in a field of view. In some embodiments, the image capture device 240 may be integrated with the server 205 and the storage 220. For example, as shown in FIG. 4, a mobile device 400 may implement operations of the image capture device 240, the server 205 and the storage 220 by hardware and/or software components of the mobile device 400. In some embodiments, the image capture device 240 may be implemented on a computing device 300 having one or more components illustrated in FIG. 3.

One of ordinary skill in the art would understand that when an element (or component) of the system 200 performs, the element may perform through electrical signals and/or electromagnetic signals. For example, when the image capture device 240 transmits out a plurality of images to the server 205, the image capture device 240 may generate an electrical signal encoding the plurality of images. The image capture device 240 may then transmit the electrical signal to an output port. If the image capture device 240 communicates with the server 205 via a wired network, the output port may be physically connected to a cable, which further may transmit the electrical signal to an input port of the server 205. If the image capture device 240 communicates with the server 205 via a wireless network, the output port of the image capture device 240 may be one or more antennas, which convert the electrical signal to electromagnetic signal. Within an electronic device, such as the image capture device 240, and/or the server 205, when a processor thereof processes an instruction, transmits out an instruction, and/or performs an action, the instruction and/or action is conducted via electrical signals. For example, when the processor retrieves or saves data from a storage medium (e.g., the storage 220, it may transmit out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 3:
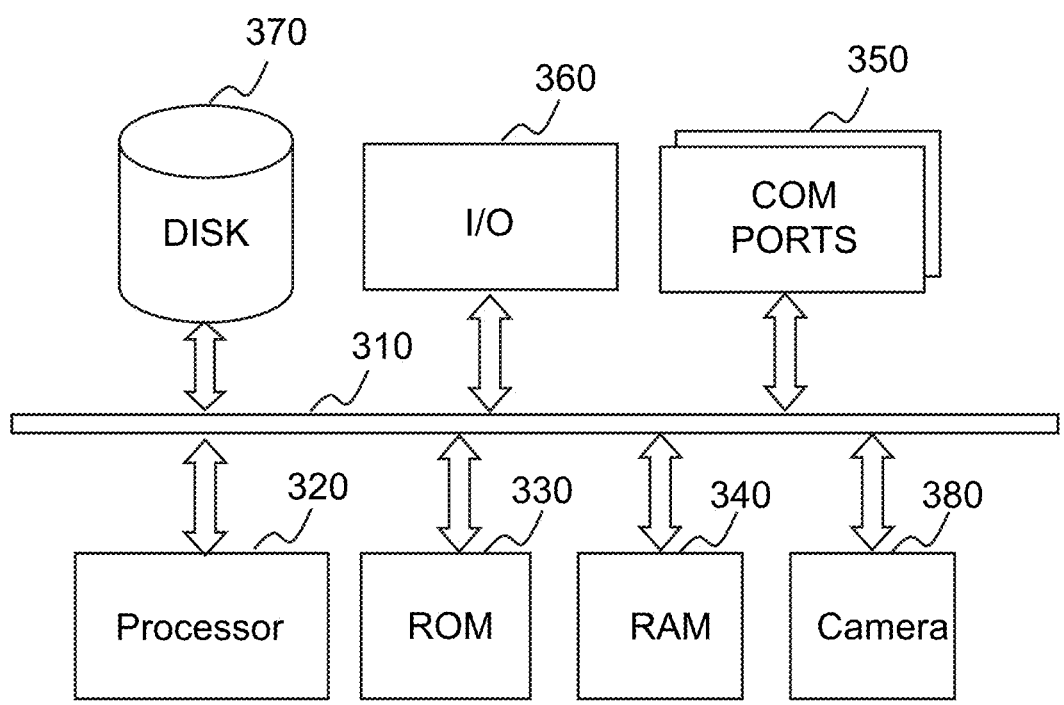
FIG. 3 is a schematic diagram illustrating exemplary hardware and/or software components of a computing device according to some embodiments of the present disclosure.
Figure 4:
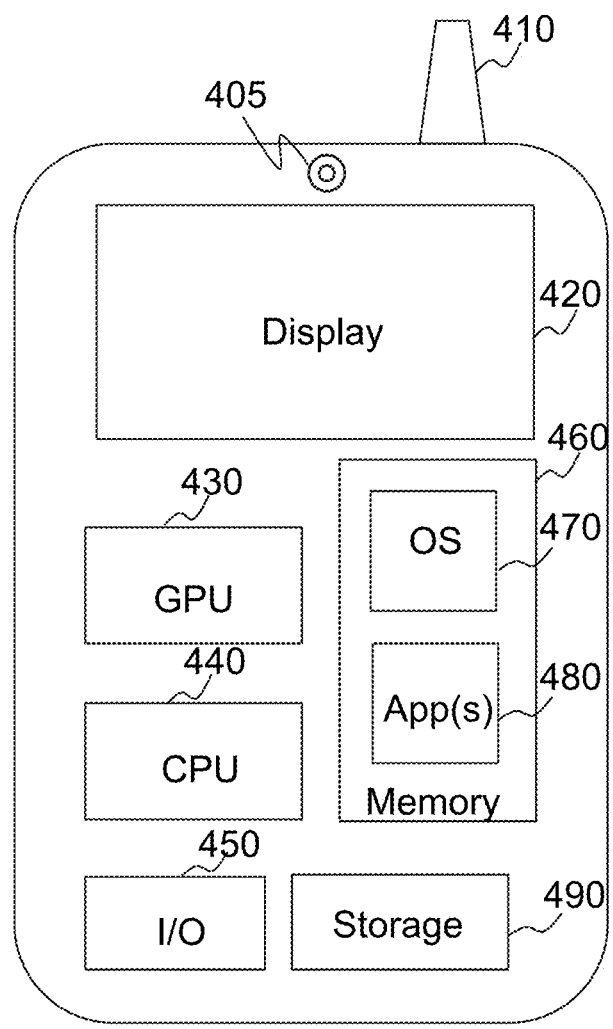
FIG. 4 is a schematic diagram illustrating exemplary hardware and/or software components of a mobile device on which the system 200 may be implemented according to some embodiments of the present disclosure.

FIG. 3 is a schematic diagram illustrating exemplary hardware and/or software components of a computing device according to some embodiments of the present disclosure. In some embodiments, the server 205, the image capture device 240 may be implemented on the computing device 300. For example, the processing engine 210 may be implemented on the computing device 300 and configured to perform functions of the processing engine 210.

The computing device 300 may be used to implement any components of the system 200 as described herein. For example, the processing engine 210 may be implemented on the computing device 300, via its hardware, software program, firmware, or a combination thereof. Although only one such computer is shown, for convenience, the computer functions relating to identifying a head-shaking movement as described herein may be implemented in a distributed fashion on a number of similar platforms to distribute the processing load.

The computing device 300, for example, may include COM ports 350 connected to and from a network connected thereto to facilitate data communications. The computing device 300 may also include a processor 320, in the form of one or more processors (e.g., logic circuits), for executing program instructions. For example, the processor 320 may include interface circuits and processing circuits therein. The interface circuits may be configured to receive electronic signals from a bus 310, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 310.

The computing device 300 may further include program storage and data storage of different forms including, for example, a disk 370, and a read-only memory (ROM) 330, or a random-access memory (RAM) 340, for various data files to be processed and/or transmitted by the computing device. The exemplary computer platform may also include program instructions stored in the ROM 330, RAM 340, and/or another type of non-transitory storage medium to be executed by the processor 320. The methods and/or processes of the present disclosure may be implemented as the program instructions. The computing device 300 may also include an I/O component 360, supporting input/output between the computer and other components. The computing device 300 may also receive programming and data via network communications. The computing device 300 may also include a camera 380 for perform functions as the image capture device 240.

Merely for illustration, only one processor is described in FIG. 3. Multiple processors are also contemplated. Thus operations and/or method steps performed by one processor as described in the present disclosure may also be jointly or separately performed by the multiple processors. For example, if in the present disclosure the processor of the computing device 300 executes both step A and step B, it should be understood that step A and step B may also be performed by two different CPUs and/or processors jointly or separately in the computing device 300 (e.g., the first processor executes step A and the second processor executes step B, or the first and second processors jointly execute steps A and B).

FIG. 4 is a schematic diagram illustrating exemplary hardware and/or software components of a mobile device on which the system 200 may be implemented according to some embodiments of the present disclosure. As illustrated in FIG. 4, the mobile device 400 may include a camera 405, a communication platform 410, a display 420, a graphics processing unit (GPU) 430, a central processing unit (CPU) 440, an I/O 450, a memory 460, a mobile operating system (OS) 470, and a storage 490. In some embodiments, any other suitable component, including but not limited to a system bus or a controller (not shown), may also be included in the mobile device 400.

In some embodiments, the mobile operating system 470 (e.g., iOS™, Android™, Windows Phone™, etc.) and one or more applications 480 may be loaded into the memory 460 from the storage 490 in order to be executed by the CPU 440. The applications 480 may include a browser or any other suitable mobile apps for receiving and rendering information relating to identifying a head-shaking movement or other information from the system 200. User interactions with the information stream may be achieved via the I/O 450 and provided to the processing engine 210 and/or other components of the system 200 via the network 230.

Figure 5:
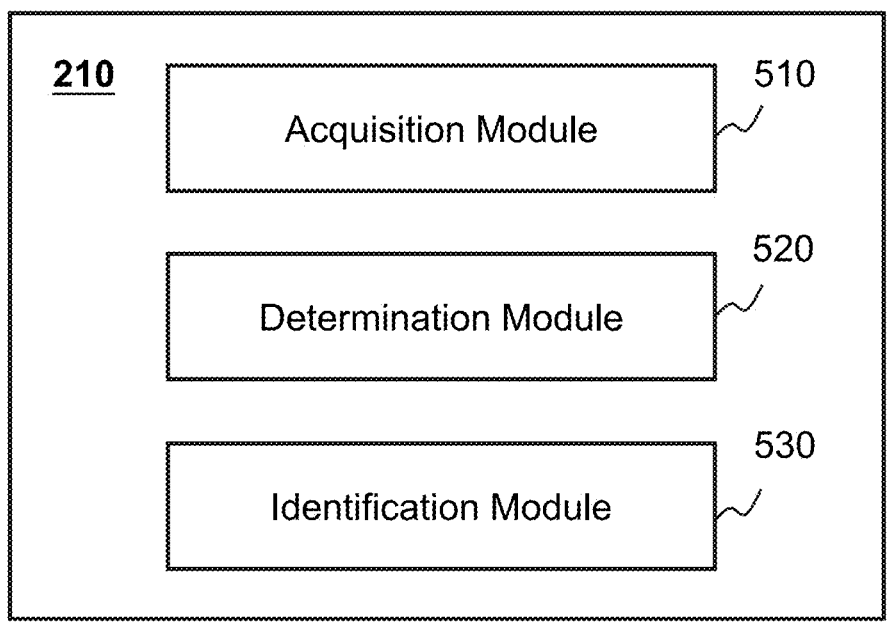
FIG. 5 is a block diagram illustrating an exemplary processing engine according to some embodiments of the present disclosure.

FIG. 5 is a block diagram illustrating an exemplary processing engine according to some embodiments of the present disclosure. The processing engine 210 may include an acquisition module 510, a determination module 520, and an identification module 530.

The acquisition module 510 may be configured to receive image data. In some embodiments, the acquisition module 510 may receive a series of images including a visual presentation of a human face from the image capture device 240. The series of images may form an image sequence, and each of the series of images may have a previous image and/or a next image in the image sequence. In some embodiments, the sequence of the series of images may follow a time sequence. The sequence of the series of images may be determined based on the time points. A specific time point may have a previous time point and/or a next time point.

The determination module 520 may be configured to determine multiple information related to the image data received by the acquisition module 510. In some embodiments, the determination module 520 may determine a plurality of characteristic points on the human face for the series of images. The plurality of characteristics points may include any points on the human face. The characteristic points may be classified into three different groups (e.g., a first group, a second group, and a third group) depending on the positions of the characteristic points in the human face. For example, the characteristic points in the first group may fall on a symmetrical line of the human face. The determination module 520 may determine positions of the plurality of characteristic points on the human face for the series of images. In some embodiments, for each of the series of images, the processing engine 210 may firstly identify related regions of the characteristic points. The determination module 520 may determine asymmetry values for the series of images based on the positions of the characteristic points for the series of images (or the images of the series of images that include a visual representation of a human face).

The identification module 530 may be configured to identify whether there is a head-shaking movement based on the asymmetry values of the series of images (or the asymmetry values of the images of the series of images that include a visual representation of a human face). In some embodiments, the identification module 530 may determine the head-shaking movement based on a variation tendency of the asymmetry values for the series of images based on the time sequence at which the series of images are captured. For example, the identification module 530 may determine a first image of the series of images in the image sequence that has an asymmetry value less than a first asymmetry value threshold and determine a second image of the series of images in the image sequence that has an asymmetry value less than the first asymmetry value threshold. The identification module 530 may also obtain asymmetry values of a group of images including the first image, the second image, and one or more images between the first image and second image in the image sequence. The identification module 530 may further identify a head-shaking movement based on the asymmetry values of the group of images and a number count of the images in the group of images.

Figure 6:
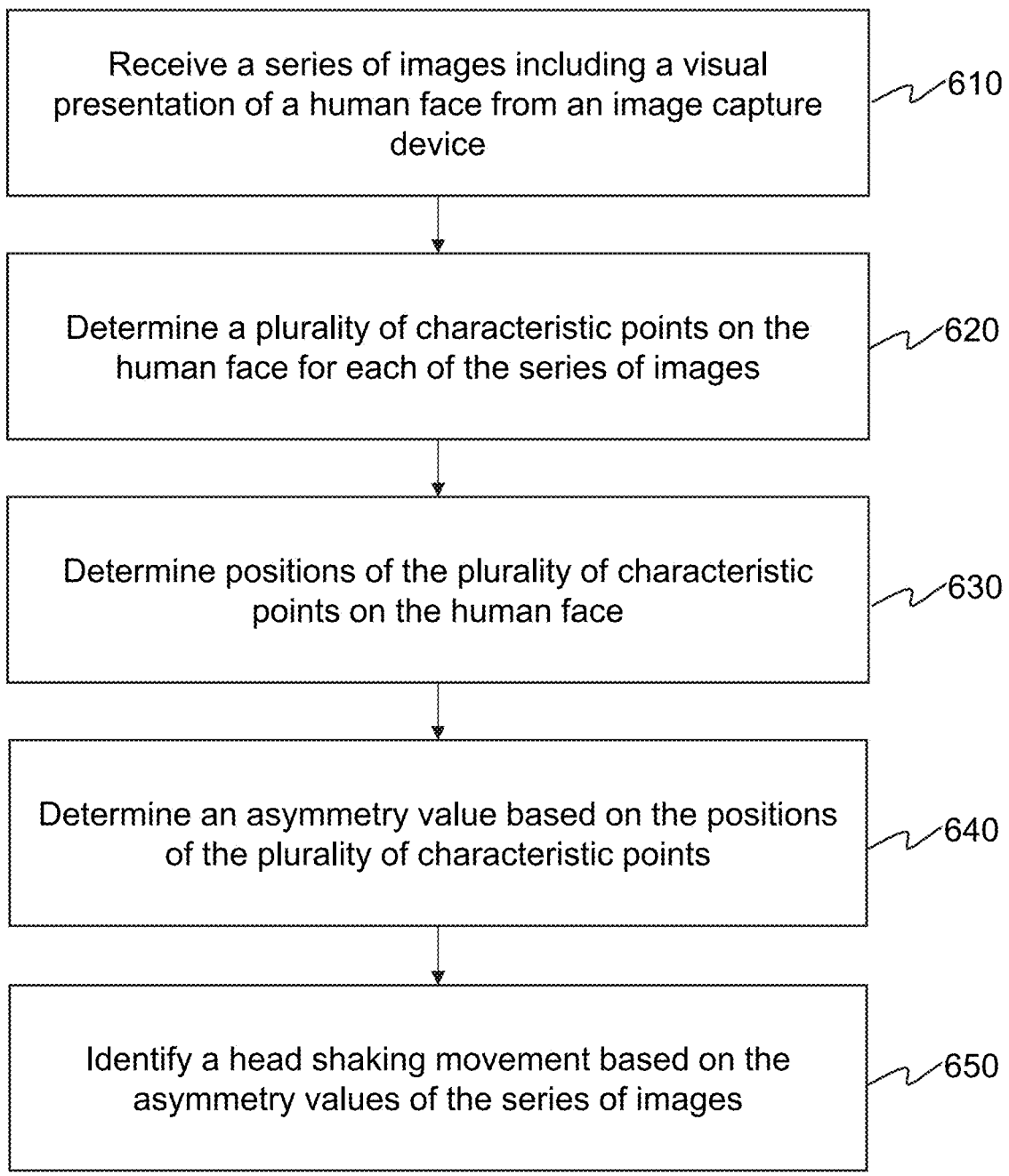
FIG. 6 is a flowchart illustrating an exemplary process for identifying a head-shaking movement according to some embodiments of the present disclosure.

FIG. 6 is a flowchart illustrating an exemplary process for identifying a head-shaking movement according to some embodiments of the present disclosure. In some embodiments, the process 600 may be implemented as a set of instructions (e.g., an application) stored in the storage ROM 330 or RAM 340. The processor 320 and/or the modules in FIG. 5 may execute the set of instructions, and when executing the instructions, the processor 320 and/or the modules may be configured to perform the process 600. The operations of the illustrated process presented below are intended to be illustrative. In some embodiments, the process 600 may be accomplished with one or more additional operations not described and/or without one or more of the operations herein discussed. Additionally, the order in which the operations of the process as illustrated in FIG. 6 and described below is not intended to be limiting.

In 610, the processing engine 210 (e.g., the acquisition module 510) may receive a series of images including a visual presentation of a human face from an image capture device 240. The series of images may form an image sequence, and each of the series of images may have a previous image and/or a next image in the image sequence. For example, the series of images may be video frames of a video captured by the image capture device 240 (e.g., a video camera), which may form an image sequence. Each of the video frames may have a previous video frame and a next video frame except the first and last video frames, which may only have a next video frame and a previous video frame, respectively. In some embodiments, the sequence of the series of images may follow a time sequence. For example, the image capture device 240 may capture images at a plurality of time points. The sequence of the series of images may be determined based on the time points. A specific time point may have a previous time point and/or a next time point. The previous video frame may be an image of the series of images that is captured by the image capture device 240 at the previous time point. The next video frame may be an image of the series of images that is captured by the image capture device 240 at the next time point. For example, the processing engine 210 may initiate a timer when the image capture device 240 begins to capture images. The image capture device 240 may capture images every 0.03 seconds. For a specific image captured at 0.06 seconds, the previous time point may be 0.03 seconds and the subsequent time point may be 0.09 seconds. Therefore, the previous image of the specific image may be captured at the time point of 0.03 seconds and the next image of the specific image may be captured at the time point of 0.09 seconds.

In some embodiments, the image capture device 240 (e.g., the laptop computer 240-1, the camera 240-2, the smartphone 240-3,) may be configured to capture images corresponding to one or more objects that appear in the field of view of the image capture device 240. For example, the image capture device 240 may detect the movement of an object (e.g., a human being) appearing in its field of view and capture images. The image capture device 240 may capture a series of images including the human face. The object(s) in the field of view of the image capture device 240 may move or make certain movements of his or her body part(s) (e.g., a head-shaking movement, a nutation movement).

In some embodiments, at least one of the series of images may include the visual presentation of the human face. The visual presentation of the human face may include a plurality of contours of one or more characteristic components of the human face. Exemplary characteristic components of a human face may include an eye, a nose, a mouth, an ear, a lip, an eyebrow, or the like, or a combination thereof. The contours of a characteristic component may include a contour of the face, a contour of the eye, a contour of the nose, etc. In some embodiments, the processing engine 210 and/or image capture device 240 may label different portions of the human face with different colors in the visual presentation of the face, and the colored regions represent characteristic components of the face. For example, the eye region may be labeled with green, the pupil region of the eye may be labeled with black, and the nose region may be labeled with blue, and so on.

In some embodiments, the processing engine 210 may transmit a request for images to the image capture device 240, which may, in response to the request, capture a series of images and/or transmit a series of images to the processing engine 210. In some embodiments, the processing engine 210 may transmit a request to the image capture device 240 asking for a user to follow certain instructions. For example, the image capture device 240, after receiving a request from the processing engine 110, may display a message to a user asking the user to move or make the certain movements of his or her body part(s) (e.g., a head-shaking movement, a nutation movement) in the field of view of the image capture device 240 in order to verify the user. The image capture device 240 may also capture images of the user.

In some embodiments, the processing engine 210 may receive the series of images from the image capture device 240 via the network 230. Alternatively, the processing engine 210 may be integrated with the image capture device 240 (e.g., the CPU 440 and the camera 405 shown in FIG. 4). The processing engine 210 may receive the series of images from the image capture device 240 via a bus (e.g., the bus 310 shown in FIG. 3).

In 620, the processing engine 210 (e.g., the determination module 520) may determine a plurality of characteristic points on the human face for the series of images. The plurality of characteristics points may include any points on the human face. The characteristic points may be classified into three groups including a first group, a second group, and a third group. Characteristic points included in the first group may fall on a symmetrical line of the human face. For example, in a front view of the human face, the symmetrical line of the human face may be a vertical line on the human face that separate the human face into a left side and a right side, and the characteristic points included in the first group may fall on the vertical line. The left side of the human face is substantially symmetrical with the right side of the human face. Characteristic points included in the second group may be in a left region of the human face. Characteristic points included in the third group may be in a right region of the human face. For a characteristic point in the second group, there may be a symmetrical characteristic point in the third group relative to the symmetrical line.

For example, the plurality characteristic points may include five points on the human face, namely a first point, a second point, a third point, a fourth point, a fifth point. The third point may fall on a symmetrical line of the human face (e.g., a vertical line passing the center of the nose and the center of the forehead) and may be in the first group. The first point and the fourth point may be in the second group. The second point and the fifth point may be in the third group. The first point and the second point may be symmetrical with respect to the symmetrical line, on which the third point may fall. The fourth point and the fifth point may be symmetrical with respect to the symmetrical line. In some embodiments, the third point may be located within a quadrangle determined based on the first point, the second point, the fourth point, and the fifth point (e.g., a quadrangle including the first, second, fourth, and fifth points). The first point, the second point, the fourth point, and the fifth point may consist four vertexes of the quadrangle. Take the human face 111 shown in FIG. 7 as an example; the characteristic points of the human face 111 may include the first point 710-1, the second point 720-1, the third point 730-1, the fourth point 740-1, and the fifth point 740-2. The first point 710-1 may be located inside a left-eye region 710. The second point 720-1 may be located inside a right-eye region 720. In some embodiments, the first point 710-1 and second point 720-1 may correspond to central regions of the two eyes respectively (e.g., the pupils of the two eyes). The third point 730-1 may be located on a tip region of a nose region 730. The fourth point 740-1 may be in a left-end region of a lip 740. The fifth point 740-2 may be in a right-end region of the lip 740. The symmetrical line 705 may pass through the third point 730-1.

Figure 7:
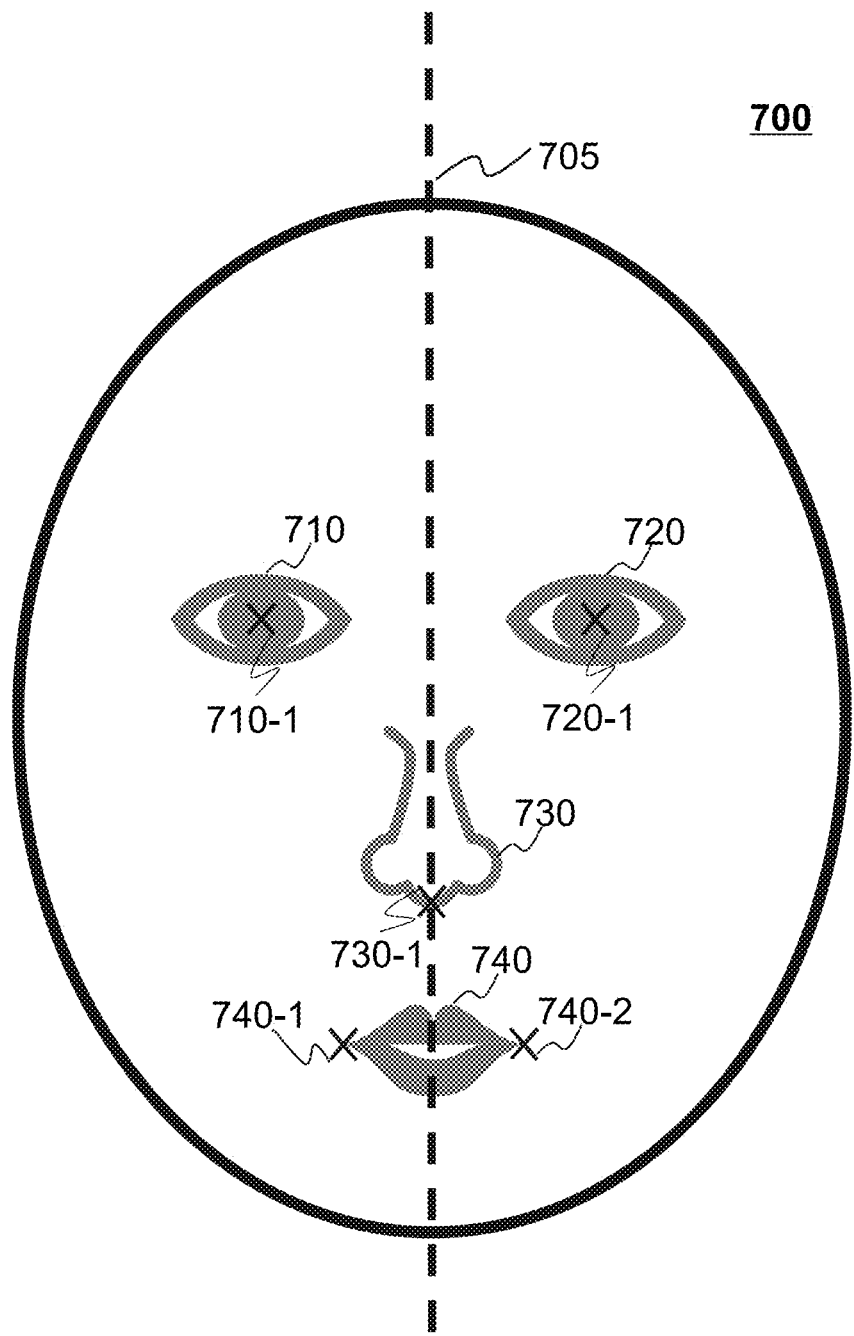
FIG. 7 is a schematic diagram illustrating an exemplary visual presentation of a human face according to some embodiments of the present disclosure.

In 630, the processing engine 210 (e.g., the determination module 520, the processor 320) may determine the positions of the plurality of characteristic points on the human face. In some embodiments, for each of the series of images, the processing engine 210 may firstly recognize related regions of the characteristic points. As used herein, a related region of a specific characteristic point refers to a region that the specific characteristic point locates in. The position of the specific characteristic point may be substantially fixed in its related region. For example, as shown in FIG. 7, the left-eye region 710 is a related region of the characteristic point 710-1. The position of the 710-1 may locate at a central point of the left-eye region 710. The distance between the central point and the upper boundary of a contour of the left-eye region 710 may be equal to the distance between the central point and the bottom boundary of the contour of the left-eye region 710. The distance between the central point and the left boundary of the contour of the left-eye region 710 may be equal to the distance between the central point and the right boundary of the contour of the left-eye region 710.

In some embodiments, the processing engine 210 may determine the characteristic points based on the related regions. For example, the processing engine 210 may identify two eye regions, a nose region, and a lip region. The processing engine 210 may further determine the five characteristic points based on the four regions. Take the left-eye region 710 as an example; the processing engine 210 may firstly identify a left-eye contour from one of the series of images. The left-eye contour may include a plurality of candidate points inside. The processing engine 210 may identify a candidate point that satisfies the characteristics of the central point of an eye region. The processing engine 210 may designate the candidate point as the first point 710-1.

In 640, the processing engine 210 (e.g., the determination module 520, the processor 320) may determine an asymmetry value based on the positions of the plurality of characteristic points for the series of images (or the images of the series of images that include a visual representation of a human face). For an image of a human face, if the image is not a front view of the human face, the left side of the human face and the right side of the human face may not be symmetrical with respect to the symmetrical line. The asymmetry value is a parameter indicating the degree of asymmetry between the left side and right side of the human face. Each of the series of images (or each of the images of the series of images that include a visual representation of a human face) may have an asymmetry value. Details about the determination of the asymmetry value of an image based on the positions of characteristic points on a human face may be found elsewhere in the present disclosure (e.g., FIG. 8 and the descriptions thereof).

In 650, the processing engine 210 (e.g., the identification module 530, the processor 320) may identify a head-shaking movement based on the asymmetry values of the series of images (or the asymmetry values of the images of the series of images that include a visual representation of a human face). In some embodiments, the processing engine 210 may determine the head-shaking movement based on a variation tendency of the asymmetry values of the series of images according to the time sequence at which the series of images are captured. Details about the identification of the head-shaking movement may be found elsewhere in the present disclosure (e.g., FIGS. 13 and 17 and the descriptions thereof).

It should be noted that the above description is provided for the purpose of illustration and is not intended to limit the scope of the present disclosure. For persons having ordinary skills in the art, multiple variations and modifications may be made under the teaching of the present disclosure. However, those variations and modifications do not depart from the scope of the present disclosure. For example, the processing engine 210 may be part of a camera. The camera may perform operations of the processing engine 210, e.g., determining a plurality of characteristic points on the human face.

FIG. 7 is a schematic diagram illustrating an exemplary visual presentation of a human face in an image according to some embodiments of the present disclosure. As shown in FIG. 7, the visual presentation 700 of the human face 111 is in a front view. The visual presentation 700 may include a left-eye region 710, a right-eye region 720, a nose region 730, and a lip region 740, etc. The visual presentation 700 may also include a symmetrical line 705 and a plurality characteristic points, namely, the first point 710-1, the second point 720-1, the third point 730-1, the fourth point 740-1, and the fifth point 740-2. As shown in FIG. 7, the first point 710-1 and the second point 720-1 may correspond to the pupils of eyes of the human face 111, respectively. The first point 710-1 and the second point 720-1 may be symmetrical with respect to the symmetrical line 705. The fifth point 740-2 and the fourth point 740-1 may be may be symmetrical with respect to the symmetrical line 705. The third point 730-1 may fall on the symmetrical line 705.

FIG. 8 is a flowchart illustrating an exemplary process for determining an asymmetry value based on the positions of the plurality of characteristic points according to some embodiments of the present disclosure. In some embodiments, the process 800 may be implemented as a set of instructions (e.g., an application) stored in the storage ROM 330 or RAM 340. The processor 320 and/or the modules in FIG. 5 may execute the set of instructions, and when executing the instructions, the processor 320 and/or the modules may be configured to perform the process 800. The operations of the illustrated process presented below are intended to be illustrative. In some embodiments, the process 800 may be accomplished with one or more additional operations not described and/or without one or more of the operations herein discussed. Additionally, the order in which the operations of the process as illustrated in FIG. 8 and described below is not intended to be limiting. In some embodiments, operation 640 of the process 600 may be performed based on the process 800 for determining the asymmetry value in each of the series of images.

In 810, for an image (e.g., each of the series of images), the processing engine 210 (e.g., the acquisition module 510) may obtain the positions of the first point, the second point, the third point, the fourth point, and the fifth point. In some embodiments, the processing engine 210 may obtain the positions from the storage 220. The storage 220 may store the positions after the determination of the positions. The descriptions of the determination of the positions of the first point, the second point, the third point, the fourth point, and the fifth point may be found elsewhere of the present disclosure (e.g., operation 630 of the process 600).

Figure 9:
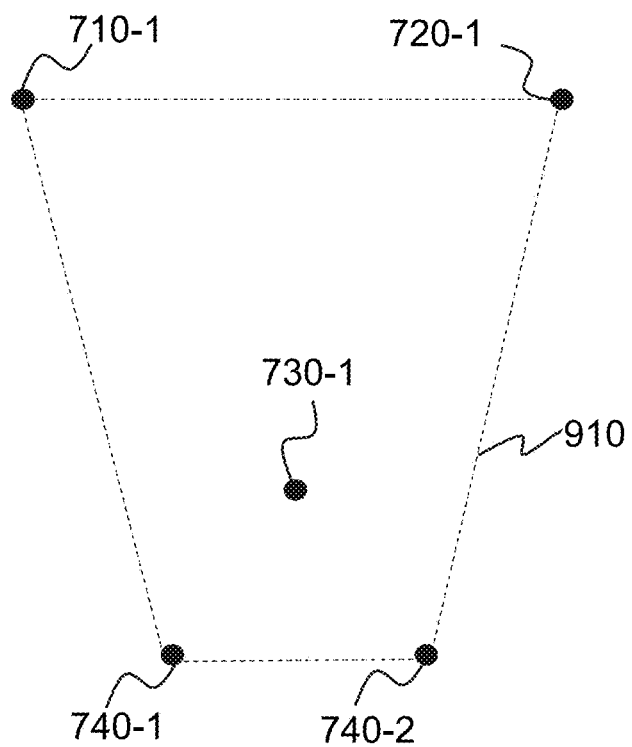
FIG. 9 is a schematic diagram illustrating exemplary characteristic points of a human face according to some embodiments of the present disclosure.

The first point, the second point, the fourth point, and the fifth point may be four vertexes of a quadrangle. In some images of the series of images, the third point may be located within the quadrangle (as shown in FIG. 9). The third point 730-1 may be located within the quadrangle. In some images of the series of images, the third point may locate outside of the quadrangle.

In 820, the processing engine 210 (e.g., the determination module 520) may determine whether the third point is located within the quadrangle formed by the first point, the second point, the fourth point, and the fifth point. If the processing engine 210 (e.g., the determination module 520) determines that the third point is not located in the quadrangle, the process 800 may proceed to 860; if the processing engine 210 (e.g., the determination module 520) determines that the third point is located in the quadrangle, the process 800 may proceed to 830.

Figure 10:
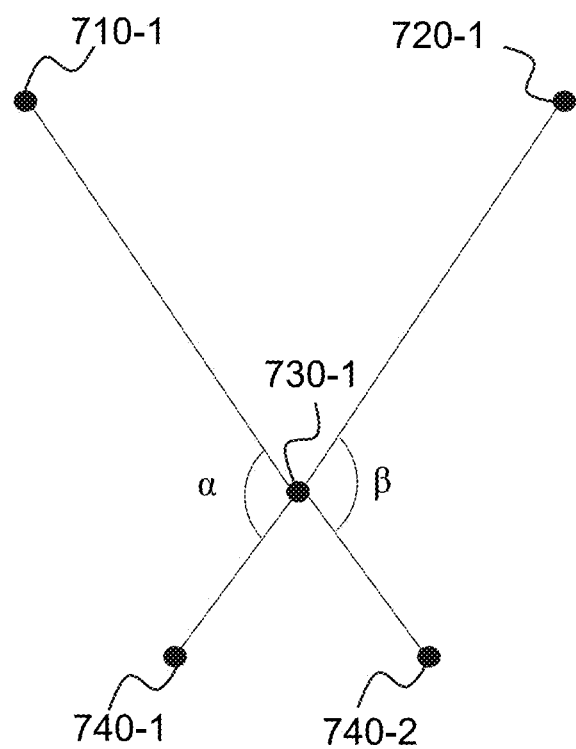
FIG. 10 is a schematic diagram illustrating exemplary first angle and second angle according to some embodiments of the present disclosure.
Figure 11:
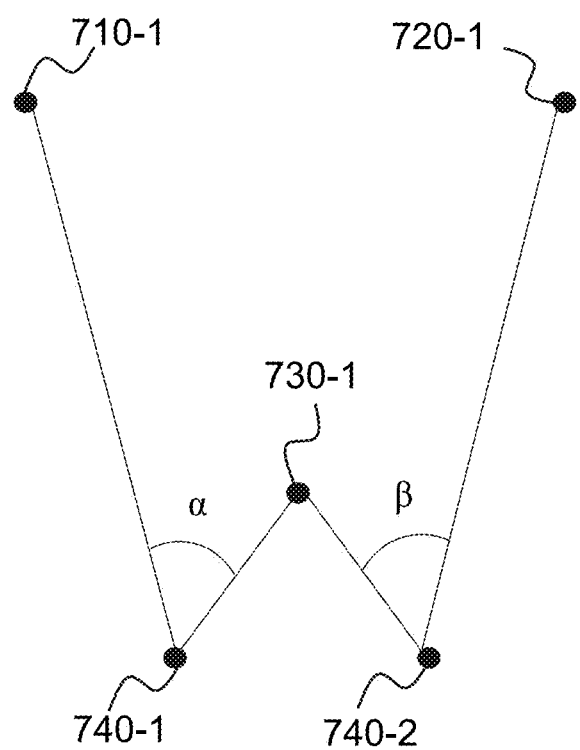
FIG. 11 is a schematic diagram illustrating exemplary first angle and second angle according to some embodiments of the present disclosure.
Figure 12:
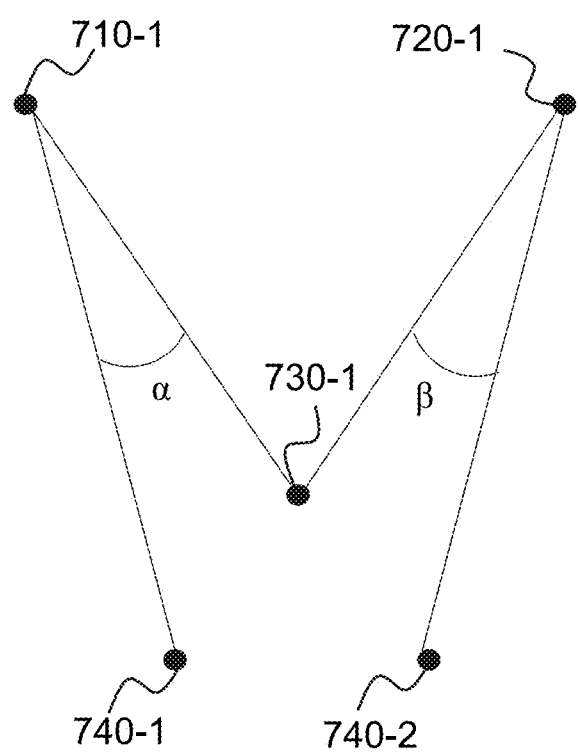
FIG. 12 is a schematic diagram illustrating exemplary first angle and second angle according to some embodiments of the present disclosure.

In 830, the processing engine 210 (e.g., the determination module 520) may determine a first angle based on the first point, the third point, and the fourth point in the each of the series of images. The first angle may be denoted by α (also referred to herein as the first angle α). For example, the first angle α may be the angle between a line segment connecting the first point 710-1 and the third point 730-1, and a line segment connecting the fourth point 740-1 and the third point 730-1, as shown in FIG. 10. Alternatively or additionally, the first angle α may be the angle between a line segment connecting the first point 710-1 and the fourth point 740-1, and a line segment connecting the fourth point 740-1 and the third point 730-1, as shown in FIG. 11. Alternatively or additionally, the first angle α may be the angle between a line segment connecting the first point 710-1 and the fourth point 740-1, and a line segment connecting the first point 710-1 and the third point 730-1, as shown in FIG. 12. Alternatively or additionally, the processing engine 210 may determine the first angle α based on the postions of the first point, the third point and the fourth point. For example, the processing engine 210 may determine the lengths of the three line segments determined by the first point, the third point and the fourth point based on the postions of the first point, the third point and the fourth point. The processing engine 210 may determine the first angle α based on the lengths of the three line segments determined by the first point, the third point and the fourth point using a trigonometric function (e.g., the sine function).

In 840, the processing engine 210 (e.g., the determination module 520) may determine a second angle based on the second point, the third point, and the fifth point in the image (e.g., each of the series of images). The second angle may be denoted by β (also referred to herein as the second angle β). For example, when the first angle α is the angle between a line segment connecting the first point 710-1 and the third point 730-1, and a line segment connecting the fourth point 740-1 and the third point 730-1, the second angle β may be the angle between a line segment connecting the second point 720-1 and the third point 730-1, and a line segment connecting the fifth point 740-2 and the third point 730-1, as shown in FIG. 10. Alternatively or additionally, when the first angle α is the angle between a line segment connecting the first point 710-1 and the fourth point 740-1, and a line segment connecting the fourth point 740-1 and the third point 730-1, the second angle β may be the angle between a line segment connecting the second point 720-1 and the fifth point 740-2, and a line segment connecting the fifth point 720-2 and the third point 730-1, as shown in FIG. 11. Alternatively or additionally, when the first angle α is the angle between a line segment connecting the first point 710-1 and the fourth point 740-1, and a line segment connecting the first point 710-1 and the third point 730-1, the second angle β may be the angle between a line segment connecting the second point 7201-1 and the fifth point 740-2, and a line segment connecting the second point 720-1 and the third point 730-1, as shown in FIG. 12. Alternatively or additionally, the processing engine 210 may determine the second angle β based on the postions of the second point, the third point and the fifth point. For example, the processing engine 210 may determine the lengths of the three line segments determined by the second point, the third point and the fifth point based on the postions of the first point, the third point and the fourth point. The processing engine 210 may determine the second angle β based on the lengths of the three line segments determined by the second point, the third point, and the fifth point using a trigonometric function (e.g., the sine function).

Figure 13:
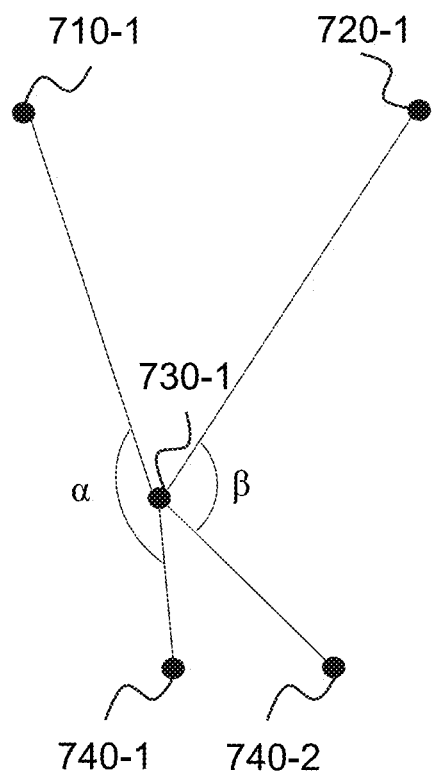
FIG. 13 is a schematic diagram illustrating exemplary first angle and second angle under a left orientation of the human face according to some embodiments of the present disclosure.
Figure 14:
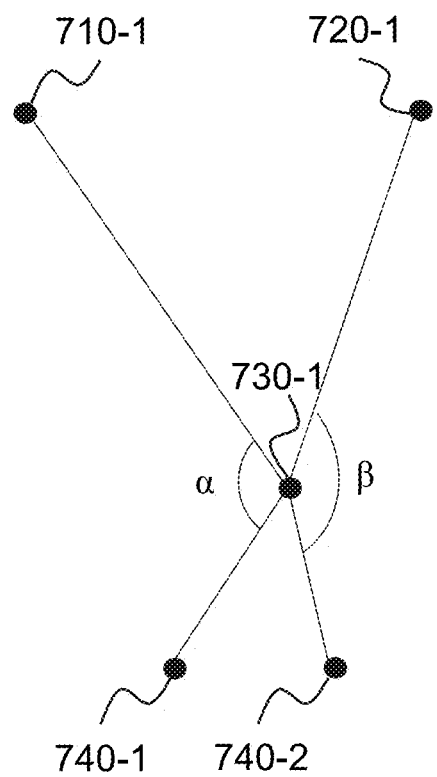
FIG. 14 is a schematic diagram illustrating exemplary first angle and second angle under a right orientation according to some embodiments of the present disclosure.

In 850, the processing engine 210 (e.g., the determination module 520) may determine the asymmetry value based on the first angle and the second angle in the each of the series of images. In some embodiments, the asymmetry value may be determined according to Equation (1) as follows:

$$\text{asymmetry value} = \left(\frac{\alpha}{\beta} + \frac{\beta}{\alpha}\right)/2, \quad (1)$$

wherein α represents the first angle, and β represents the second angle. The asymmetry value corresponding to a frontal orientation of the human face may be a minimal value (e.g., equal to 1) in comparison with the asymmetry values corresponding to a left orientation/right orientation of the human face. The frontal orientation of the human face refers to that the human's head faces the camera directly. The left orientation of the human face refers to that the human's head turns from the frontal orientation to the left side of the human face. The right orientation of the human face refers to that the human's head turns from the frontal orientation to the right side of the human face. For example, when the human face is in the frontal orientation, the first angle α may be equal to the second angle β. The asymmetry value at this situation may be equal to about 1 (ignoring the minimut error caused by the asymmetrical positions of the characteristic points on the human face). As another example, as shown in FIG. 13, when the human face is at the left orientation, the first angle α may be greater than the second angle β. The correponding asymmetry value at this situation may be greater than 1. As another example, as shown in FIG. 14, when the human face is at the right orientation, the first angle α may be less than the second angle β. The correponding asymmetry value at this situation may be greater than 1.

In 860, the processing engine 210 (e.g., the determination module 520) may determine the asymmetry value according to an asymmetry value of a previous image of the each of the series of images. In some embodiments, the processing engine 210 may determine the previous image of the each of the series of images based on the image sequence formed by the series of image. The processing engine 210 may determine the asymmetry value of the previous image of the each of the series of images by operating the process 800. The processing engine 210 may then designate the asymmetry value of the previous image of the each of the series of images as the asymmetry of the each of the series of images.

It should be noted that the above description is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure. For example, the operations 830 and 840 may be operated in one operation. As another example, a storing operation may be added in the process 800 such as between the operations 840 and 850.

FIG. 9 is a schematic diagram illustrating exemplary characteristic points of a human face according to some embodiments of the present disclosure. The characteristic points, including the first point 710-1, the second point 720-1, the third point 730-1, the fourth point 740-1, and the fifth point 740-2, may correspond to the characteristic points on the human face 111 as shown in FIG. 7. The first point 710-1, the second point 720-1, the fourth point 740-1, and the fifth point 740-2 may be four vertexes of a quadrangle 910, and the third point 730-1 may be located within the quadrangle 910.

FIG. 10 is a schematic diagram illustrating exemplary first angle and second angle according to some embodiments of the present disclosure. As shown in FIG. 10, the first angle α may be the angle between a line segment connecting the first point 710-1 and the third point 730-1, and a line segment connecting the fourth point 740-1 and the third point 730-1, and the second angle β may be the angle between a line segment connecting the second point 720-1 and the third point 730-1, and a line segment connecting the fifth point 740-2 and the third point 730-1.

FIG. 11 is a schematic diagram illustrating exemplary first angle and second angle according to some embodiments of the present disclosure. As shown in FIG. 11, the first angle α may be the angle between a line segment connecting the first point 710-1 and the fourth point 740-1, and a line segment connecting the fourth point 740-1 and the third point 730-1, and the second angle β may be the angle between a line segment connecting the second point 720-1 and the fifth point 740-2, and a line segment connecting the fifth point 740-2 and the third point 730-1.

FIG. 12 is a schematic diagram illustrating exemplary first angle and second angle according to some embodiments of the present disclosure. As shown in FIG. 12, the first angle α may be the angle between a line segment connecting the first point 710-1 and the fourth point 740-1, and a line segment connecting the first point 710-1 and the third point 730-1, and the second angle β may be the angle between a line segment connecting the second point 720-1 and the fifth point 740-2, and a line segment connecting the second point 720-1 and the third point 730-1.

FIG. 13 is a schematic diagram illustrating exemplary first angle and second angle under a left orientation of the human face according to some embodiments of the present disclosure. As shown in FIG. 13, the first angle α may be greater than the second angle β.

FIG. 14 is a schematic diagram illustrating exemplary first angle and second angle under a right orientation of the human face according to some embodiments of the present disclosure. As shown in FIG. 14, the first angle α may be less than the second angle β.

FIG. 15 is a flowchart illustrating an exemplary process for identifying a head-shaking movement according to some embodiments of the present disclosure. In some embodiments, the process 1500 may be implemented as a set of instructions (e.g., an application) stored in the storage ROM 330 or RAM 340. The processor 320 and/or the modules in FIG. 5 may execute the set of instructions, and when executing the instructions, the processor 320 and/or the modules may be configured to perform the process 1500. The operations of the illustrated process presented below are intended to be illustrative. In some embodiments, the process 1500 may be accomplished with one or more additional operations not described and/or without one or more of the operations herein discussed. Additionally, the order in which the operations of the process as illustrated in FIG. 15 and described below is not intended to be limiting. In some embodiments, operation 650 of the process 600 may be performed based on the process 1500 for identifying a head-shaking movement based on the asymmetry values of the series of images In 1510, the processing engine 210 (e.g., the identification module 530) may determine a first image of the series of images in the image sequence that has an asymmetry value less than a first asymmetry value threshold. If the asymmetry value of a specific image of the series of images is less than the first asymmetry value threshold, the human face on the specific image may be considered as in the front view. In some embodiments, the first asymmetry value threshold may be chosen based on the tolerance of detection error of the characteristic points of the human face and/or the physiological asymmetry of the human face. For example, the first asymmetry value threshold may be greater than and close to 1, for example, 1.02, 1.05. In some embodiments, the first asymmetry value threshold may be in the range of 1.01 to 1.20. In some embodiments, the first asymmetry value threshold may be restricted in subranges of 1.01 to 1.02, 1.02 to 1.04, 1.04 to 1.06, 1.06 to 1.10, 1.10 to 1.15, and 1.15 to 1.20. The processing engine 210 may retrieve the asymmetry values of the series of images based on its sequence. Once the processing engine 210 firstly determines a specific image of which the asymmetry value is less than the first asymmetry value threshold, it may designate the specific image as the first image.

In 1520, the processing engine 210 (e.g., the identification module 530) may determine a second image of the series of images in the image sequence that has an asymmetry value less than the first asymmetry value threshold. The second image may be a subsequent image to the first image in the image sequence. After determining the first image, the processing engine 210 may further retrieve the series of images based on the image sequence. When the processing engine 210 determines another image whose asymmetry value is less than the first asymmetry value threshold, the processing engine 210 may designate that image as the second image. The first image and the second image may both contain a human face at the frontal orientation. In a head-shaking movement, the first image may correspond to an initial state that the human face is in a frontal orientation. The second image may correspond to a second state that the human face turns back to the frontal orientation subsequently after the initial state.

In 1530, the processing engine 210 (e.g., the identification module 530) may obtain asymmetry values of a group of images including the first image, the second image, and one or more images between the first image and second image in the image sequence. In some embodiments, the group of images may correspond to a full-turn of the human face. The full-turn of the human face refers to a movement in which the human's head shakes from the initial state to the second state. In some embodiments, the processing engine 210 may obtain asymmetry values of the group of images from the storage 220 that stores asymmetry values of the series of images in the image sequence.

In 1540, the processing engine 210 (e.g., the identification module 530) may identify a head-shaking movement based on the asymmetry values of the group of images and a number count of the images in the group of images. In some embodiments, the processing engine 210 may determine the number count of the images in the group of images based on sequence numbers of the group of images. In some embodiments, the processing engine 210 may identify the head-shaking movement when the asymmetry values of the group of images and the number count of the images in the group of images both satisfy certain conditions. The conditions may be related to thresholds of the asymmetry value and/or the number count. Details about the identification of the head-shaking movement may be found elsewhere in the present disclosure (e.g., FIG. 16 and the descriptions thereof).

It should be noted that the above description is provided for the purpose of illustration and is not intended to limit the scope of the present disclosure. For persons having ordinary skills in the art, multiple variations and modifications may be made under the teaching of the present disclosure. However, those variations and modifications do not depart from the scope of the present disclosure. For example, an operation may be added in the process 800, such as between the operation 1530 and 1540, for determining the number count of the images in the group of images.

Figure 16:
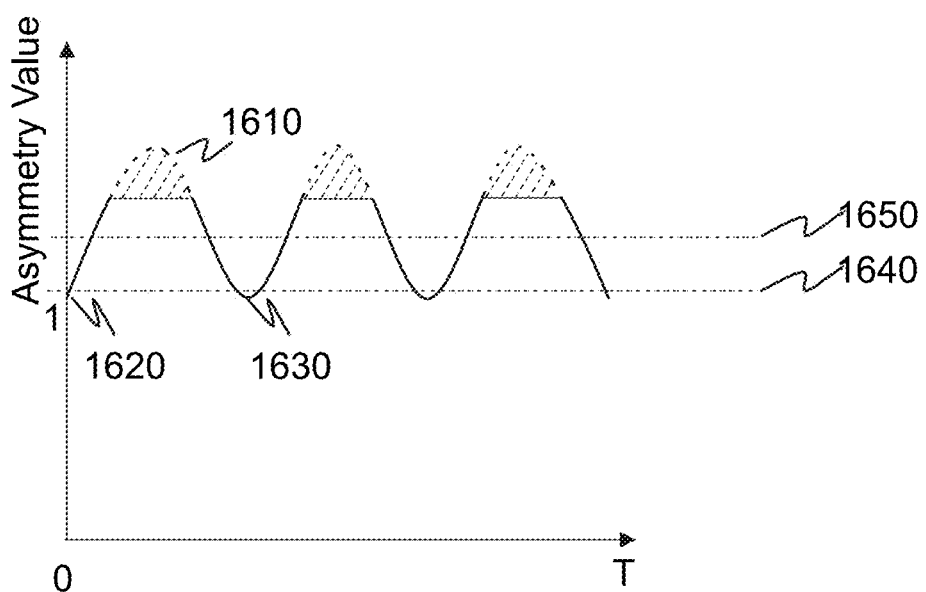
FIG. 16 is a schematic diagram illustrating a relationship between the asymmetry value and time (T) of three full-turn of the head-shaking movement according to some embodiments of the present disclosure.

FIG. 16 is a schematic diagram illustrating a relationship between the asymmetry values and times (T) of three full turns of the head-shaking movement according to some embodiments of the present disclosure. As shown in FIG. 16, the time point when the human face is in a first frontal orientation may be designated as T=0. The asymmetry value at this time point may be close to 1 and less than the first asymmetry value threshold 1640. During the movement that the human shakes his or her head from the first frontal orientation 1620 to a left or right orientation, the asymmetry values increase over time until the third point is out of the quadrangle. The asymmetry values corresponding to the orientation of the face at which the third point is out of the quadrangle (as shaded regions 1610 in FIG. 16) may be equal to the maximal asymmetry value that the third point is located on one side of the quadrangle. During the movement that the human shakes his or her head from the left or right orientation to the second frontal orientation 1630, the asymmetry values decrease over time and are less than the first asymmetry value threshold 1640. The asymmetry values corresponding to a full turn of the human face (i.e., from a front orientation to a next front orientation) may increase first and then decrease as shown in FIG. 16 from the first frontal orientation to the second frontal orientation. The second asymmetry value threshold 1650 represents an amplitude of the movement. In a full turn of the movement, if the maximum asymmetry value is greater than the second asymmetry value threshold 1650, the movement may be considered as a head-shaking movement. The second asymmetry value threshold may be designated as greater than 1. In some embodiments, the second asymmetry value threshold may be in the range of 1 to 1.3. Alternatively, the second asymmetry value threshold may be restricted in subranges of 1.0 to 1.1 or 1.1 to 1.2, 1.2 to 1.3. In some embodiments, the second asymmetry value threshold may be 1.2.

Figure 17:
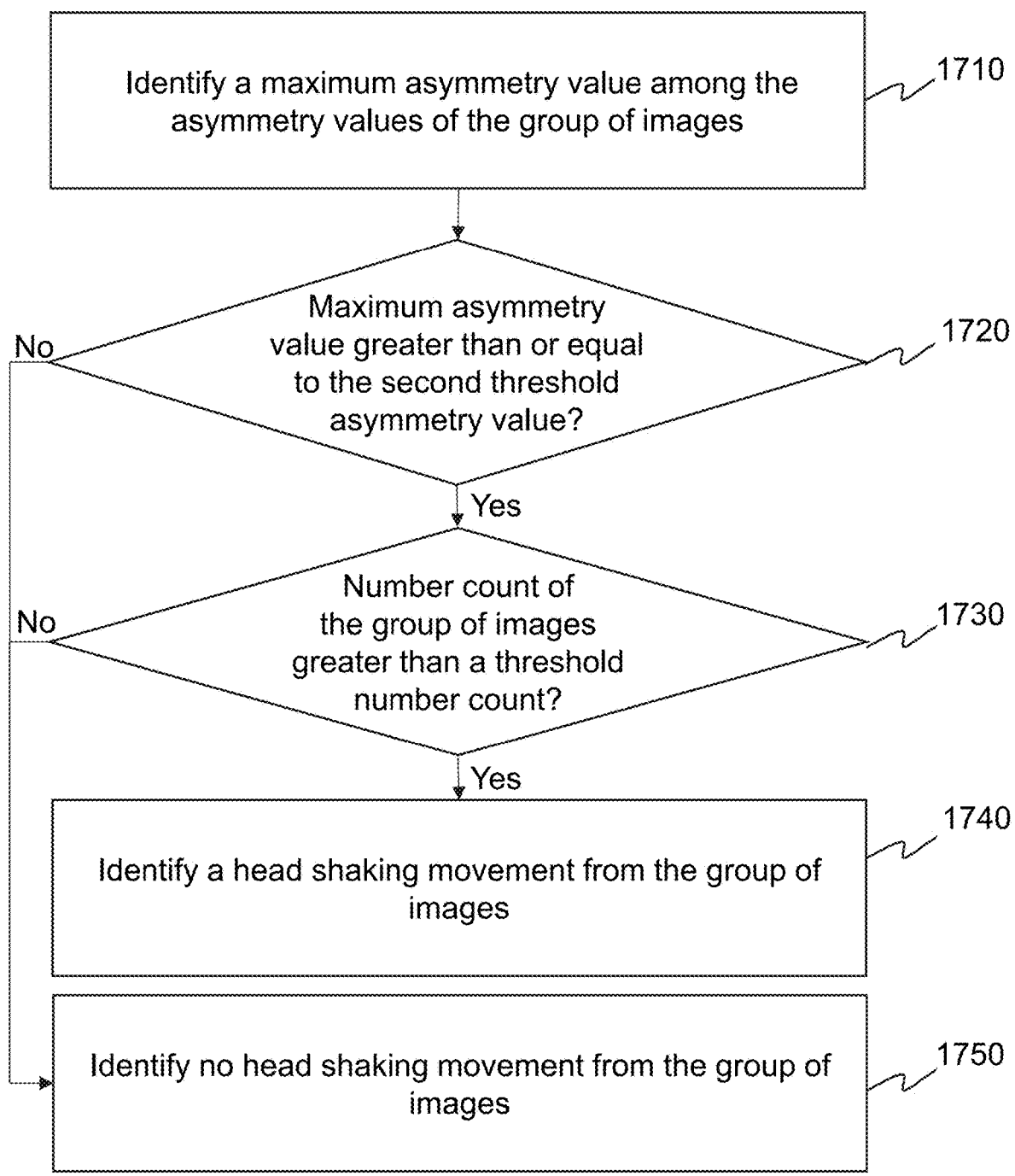
FIG. 17 is a flowchart illustrating an exemplary process for identifying a head-shaking movement according to some embodiments of the present disclosure.

FIG. 17 is a flowchart illustrating an exemplary process for identifying a head-shaking movement according to some embodiments of the present disclosure. In some embodiments, the process 1700 may be implemented as a set of instructions (e.g., an application) stored in the storage ROM 330 or RAM 340. The processor 320 and/or the modules in FIG. 5 may execute the set of instructions, and when executing the instructions, the processor 320 and/or the modules may be configured to perform the process 1700. The operations of the illustrated process presented below are intended to be illustrative. In some embodiments, the process 1700 may be accomplished with one or more additional operations not described and/or without one or more of the operations herein discussed. Additionally, the order in which the operations of the process as illustrated in FIG. 17 and described below is not intended to be limiting. In some embodiments, operation 1540 of the process 1500 may be performed based on the process 1700 for identifying a head-shaking movement of the human face based on the asymmetry values of the group of images and a number count of the images in the group of images.

In 1710, the processing engine 210 (e.g., the identification module 530) may identify the maximum asymmetry value among the asymmetry values of the group of images.

In 1720, the processing engine 210 (e.g., the identification module 530) may determine whether the maximum asymmetry value is greater than or equal to the second asymmetry value threshold. If the processing engine 210 (e.g., the identification module 530) determines that the maximum asymmetry value is greater than or equal to the second asymmetry value threshold, the process 1700 may proceed to 1730; if the processing engine 210 (e.g., the identification module 530) determines that the maximum asymmetry value is less than the second asymmetry value threshold, the process 1700 may proceed to 1750.

In 1730, the processing engine 210 (e.g., the identification module 530) may determine whether the number count of the images in the group of images is greater than or equal to a threshold number count. The threshold number count may be a predetermined threshold value based on a frame rate of the image capture device 240. The frame rate refers to the number of frames captured by the image capture device 240 per second. The greater the framerate is, the greater the threshold number count may be. For example, the threshold number count may be designated as 10 if the framerate of the image capture device 240 is 30 frames per second (fps). As another example, the threshold number count may be designated as 12 when the framerate of the image capture device 240 is 35 frames per second (fps). If the processing engine 210 (e.g., the identification module 530) determines that the number count of the images in the group of images is greater than or equal to the threshold number count, the process 1700 may proceed to 1740. If the processing engine 210 (e.g., the identification module 530) determines that the number count of the images in the group of images is less than the threshold number count, the process 1700 may proceed to 1750.

In 1740, the processing engine 210 (e.g., the identification module 530) may identify a head-shaking movement from the group of images. The processing engine 210 may identify the head-shaking movement based on both conditions, namely, the determination that the maximum asymmetry value is greater than or equal to the second asymmetry value threshold and the determination that the number count of the images in the group of images is greater than or equal to the threshold number count.

In 1750, the processing engine 210 (e.g., the identification module 530) may identify no shaking movement of the human face from the group of images. The processing engine 210 may identify no shaking movement of the human face based on either of the determination that the maximum asymmetry value is less than the second asymmetry value threshold and the determination that the number count of the images in the group of images is less than the threshold number count.

It should be noted that the above description is provided for the purpose of illustration and is not intended to limit the scope of the present disclosure. For persons having ordinary skills in the art, multiple variations and modifications may be made under the teaching of the present disclosure. However, those variations and modifications do not depart from the scope of the present disclosure. For example, the operation 1720 and 1730 may be operated in one operation.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:
   an image capture device;
   a storage device including a set of instructions; and
   at least one processor in communication with the storage device, wherein when executing the set of instructions, the at least one processor is directed to cause the system to:
      receive, from the image capture device, a series of images including a visual presentation of a human face, the series of images forming an image sequence, each of the series of images having a previous image or a next image in the image sequence;
      for each of the series of images:
         determine a plurality of characteristic points on the human face, wherein
            the plurality of characteristic points include a first point, a second point, a third point, a fourth point, and a fifth point; and
            in a front view of the human face:
               the first point and the second point are symmetrical with respect to a symmetrical line through the third point,
               the fourth point and the fifth point are symmetrical with respect to the symmetrical line through the third point, and
               the third point is located within a quadrangle determined based on the first point, the second point, the fourth point, and the fifth point;

determine positions of the plurality of characteristic points on the human face; and
determine an asymmetry value based on the positions of the plurality of characteristic points, wherein to determine the asymmetry value based on the positions of the plurality of characteristic points for each of the series of images, the processor is further directed to cause the system to:
determine whether the third point in the each of the series of images is not located within the quadrangle determined based on the first point, the second point, the fourth point, and the fifth point in the each of the series of images;
determine, based on a result of the determination that the third point in the each of the series of images is not located within the quadrangle determined based on the first point, the second point, the fourth point, and the fifth point in the each of the series of images, the asymmetry value according to an asymmetry value of a previous image of the each of the series of images; and
based on a result of the determination that the third point in the each of the series of images is located within the quadrangle determined based on the first point, the second point, the fourth point, and the fifth point in the each of the series of images:
determine a first angle based on the first point, the third point, and the fourth point;
determine a second angle based on the second point, the third point, and the fifth point; and
determine the asymmetry value based on the first angle and the second angle; and
identify a head-shaking movement of the human face based on the asymmetry values of the series of images.

2. The system of claim 1, wherein:
the first point is in a central region of a left-eye on the human face;
the second point is in a central region of a right-eye on the human face;
the third point is in a tip region of a nose on the human face;
the fourth point is in a left end region of a lip on the human face; and
the fifth point is in a right end region of the lip of the human face.

3. The system of claim 1, wherein:
the first angle is an angle between a line segment connecting the first point and the third point, and a line segment connecting the fourth point and the third point; and
the second angle is an angle between a line segment connecting the second point and the third point, and a line segment connecting the fifth point and the third point.

4. The system of claim 1, wherein:
the first angle is an angle between a line segment connecting the first point and the fourth point, and a line segment connecting the fourth point and the third point; and
the second angle is an angle between a line segment connecting the second point and the fifth point, and a line segment connecting the fifth point and the third point.

5. The system of claim 1, wherein:
the first angle is an angle between a line segment connecting the first point and the fourth point, and a line segment connecting the first point and the third point; and
the second angle is an angle between a line segment connecting the second point and the fifth point, and a line segment connecting the second point and the third point.

6. The system of claim 1, wherein to identify the head-shaking movement of the human face based on the asymmetry values of the series of images, the processor is further directed to cause the system to:
determine a first image of the series of images in the image sequence that has an asymmetry value less than a first asymmetry value threshold;
determine a second image of the series of images in the image sequence that has an asymmetry value less than the first asymmetry value threshold, the second image being a subsequent image of the first image in the image sequence;
obtain asymmetry values of a group of images including the first image, the second image, and one or more images between the first image and second image in the image sequence; and
identify the head-shaking movement of the human face based on the asymmetry values of the group of images and a number count of images in the group of images.

7. The system of claim 6, wherein to identify the head-shaking movement of the human face based on the asymmetry values of the group of images and the number count of the images in the group of images, the processor is further directed to cause the system to:
identify a maximum asymmetry value among the asymmetry values of the group of images;
determine whether the maximum asymmetry value is greater than a second asymmetry value threshold;
determine whether the number count of images in the group of images is greater than a threshold number count; and
identify the head-shaking movement of the human face from the group of images based on a result of the determination that the maximum asymmetry value is greater than the second asymmetry value threshold and a result of the determination that the number count of images in the group of images is greater than the threshold number count.

8. A method, comprising:
receiving, from an image capture device, a series of images including a visual presentation of a human face, the series of images forming an image sequence, each of the series of images having a previous image or a next image in the image sequence;
for each of the series of images:
determining a plurality of characteristic points on the human face, wherein
the plurality of characteristic points include a first point, a second point, a third point, a fourth point, and a fifth point; and
in a front view of the human face:
the first point and the second point are symmetrical with respect to a symmetrical line through the third point,
the fourth point and the fifth point are symmetrical with respect to the symmetrical line through the third point, and the third point is located within a quadrangle determined based on the first point, the second point, the fourth point, and the fifth point;

determining positions of the plurality of characteristic points on the human face; and determining an asymmetry value based on the positions of the plurality of characteristic points, wherein the determining the asymmetry value based on the positions of the plurality of characteristic points for each of the series of images includes:

determining whether the third point in the each of the series of images is not located within the quadrangle determined based on the first point, the second point, the fourth point, and the fifth point in the each of the series of images;

determining, based on a result of the determination that the third point in the each of the series of images is not located within the quadrangle determined based on the first point, the second point, the fourth point, and the fifth point in the each of the series of images, the asymmetry value according to an asymmetry value of a previous image of the each of the series of images; and based on a result of the determination that the third point in the each of the series of images is located within the quadrangle determined based on the first point, the second point, the fourth point, and the fifth point in the each of the series of images:

determining a first angle based on the first point, the third point, and the fourth point;

determining a second angle based on the second point, the third point, and the fifth point; and determining the asymmetry value based on the first angle and the second angle; and identifying a head-shaking movement of the human face based on the asymmetry values of the series of images.

9. The method of claim 8, wherein:

the first point is in a central region of a left-eye on the human face;

the second point is in a central region of a right-eye on the human face;

the third point is in a tip region of a nose on the human face;

the fourth point is in a left end region of a lip on the human face; and the fifth point is in a right end region of the lip of the human face.

10. The method of claim 8, wherein:

the first angle is an angle between a line segment connecting the first point and the third point, and a line segment connecting the fourth point and the third point; and the second angle is an angle between a line segment connecting the second point and the third point, and a line segment connecting the fifth point and the third point.

11. The method of claim 8, wherein:

the first angle is an angle between a line segment connecting the first point and the fourth point, and a line segment connecting the fourth point and the third point; and the second angle is an angle between a line segment connecting the second point and the fifth point, and a line segment connecting the fifth point and the third point.

12. The method of claim 8, wherein:

the first angle is an angle between a line segment connecting the first point and the fourth point, and a line segment connecting the first point and the third point; and the second angle is an angle between a line segment connecting the second point and the fifth point, and a line segment connecting the second point and the third point.

13. The method of claim 8, wherein the identifying the head-shaking movement of the human face based on the asymmetry values of the series of images includes:

determining a first image of the series of images in the image sequence that has an asymmetry value less than a first asymmetry value threshold;

determining a second image of the series of images in the image sequence that has an asymmetry value less than the first asymmetry value threshold, the second image being a subsequent image of the first image in the image sequence;

obtaining asymmetry values of a group of images including the first image, the second image, and one or more images between the first image and second image in the image sequence; and identifying the head-shaking movement of the human face based on the asymmetry values of the group of images and a number count of images in the group of images.

14. The method of claim 13, wherein the identifying the head-shaking movement of the human face based on the asymmetry values of the group of images and the number count of the images in the group of images includes:

identifying a maximum asymmetry value among the asymmetry values of the group of images;

determining whether the maximum asymmetry value is greater than a second asymmetry value threshold;

determining whether the number count of images in the group of images is greater than a threshold number count; and identifying the head-shaking movement of the human face from the group of images based on a result of the determination that the maximum asymmetry value is greater than the second asymmetry value threshold and a result of the determination that the number count of images in the group of images is greater than the threshold number count.

15. A non-transitory computer-readable medium, comprising at least one set of instructions, wherein when executed by at least one processor of a computer device, the at least one set of instructions directs the at least one processor to:

receive, from an image capture device, a series of images including a visual presentation of a human face, the series of images forming an image sequence, each of the series of images having a previous image or a next image in the image sequence;

for each of the series of images:

determine a plurality of characteristic points on the human face, wherein the plurality of characteristic points include a first point, a second point, a third point, a fourth point, and a fifth point; and in a front view of the human face:

the first point and the second point are symmetrical with respect to a symmetrical line through the third point, the fourth point and the fifth point are symmetrical with respect to the symmetrical line through the third point, and the third point is located within a quadrangle determined based on the first point, the second point, the fourth point, and the fifth point;

determine positions of the plurality of characteristic points on the human face; and determine an asymmetry value based on the positions of the plurality of characteristic points, wherein to determine the asymmetry value based on the positions of the plurality of characteristic points for each of the series of images, the at least one set of instructions directs the at least one processor to:

determine whether the third point in the each of the series of images is not located within the quadrangle determined based on the first point, the second point, the fourth point, and the fifth point in the each of the series of images;

determine, based on a result of the determination that the third point in the each of the series of images is not located within the quadrangle determined based on the first point, the second point, the fourth point, and the fifth point in the each of the series of images, the asymmetry value according to an asymmetry value of a previous image of the each of the series of images; and based on a result of the determination that the third point in the each of the series of images is located within the quadrangle determined based on the first point, the second point, the fourth point, and the fifth point in the each of the series of images:

determine a first angle based on the first point, the third point, and the fourth point;

determine a second angle based on the second point, the third point, and the fifth point; and determine the asymmetry value based on the first angle and the second angle; and identify a head-shaking movement of the human face based on the asymmetry values of the series of images.

* * * * *